United States Patent [19]
Bosman

[11] 3,782,821
[45] Jan. 1, 1974

[54] PHOTOGRAPHIC ENLARGER

[75] Inventor: Alfred E. F. Bosman, Heidelberg, T.V.L., South Africa

[73] Assignee: The Raymond Lee Organization, Inc., New York, N.Y.

[22] Filed: Nov. 10, 1972

[21] Appl. No.: 305,526

[52] U.S. Cl. .................................. 355/70, 355/71
[51] Int. Cl. ........................................... G03b 27/54
[58] Field of Search ................... 355/18, 44, 45, 70, 355/71

[56] References Cited
UNITED STATES PATENTS

| | | | |
|---|---|---|---|
| 3,044,351 | 7/1962 | Patterson | 355/70 X |
| 3,060,796 | 10/1962 | Muse, Jr. | 355/44 X |
| 3,579,338 | 5/1971 | Ooue et al. | 355/70 X |
| 3,619,055 | 11/1971 | Archer et al. | 355/70 X |
| 3,639,054 | 2/1972 | Wally, Jr. | 355/70 X |
| 3,682,539 | 8/1972 | Yamaji et al. | 355/70 X |
| 3,716,298 | 2/1973 | Reardon | 355/70 X |

*Primary Examiner*—Samuel S. Matthews
*Assistant Examiner*—Richard A. Wintercorn
*Attorney*—Daniel Jay Tick

[57] ABSTRACT

A photographic enlarger comprises a housing having a light outlet opening and a condenser at such opening adapted to illuminate a negative to be enlarged. A first light source mounted in the housing is a full-sized lamp. A second light source mounted in the housing is a flash-light. A shutter is pivotally mounted in the housing and has one position in which it blocks light from the second light source and directs light from the first light source through the condenser, and another position in which it blocks light from the first light source and directs light from the second light source through the condenser.

5 Claims, 4 Drawing Figures

PATENTED JAN 1 1974  3,782,821

PHOTOGRAPHIC ENLARGER

DESCRIPTION OF THE INVENTION

The present invention relates to a photographic enlarger.

The principal object of the invention is to provide a photographic enlarger of simple structure which is considerably less expensive in manufacture than enlargers utilizing strong lights and therefore elaborate cooling systems, and operates with efficiency, effectiveness and reliability.

An object of the invention is to provide a photographic enlarger which produces large enlargements with great facility and convenience.

Another object of the invention is to provide a photographic enlarger having shorter exposure times than enlargers utilizing ordinary lights.

Still another object of the invention is to provide a photographic enlarger which produces sharper prints than known enlargers and utilizes smaller apertures than known enlargers to increase the definition of the prints.

In order that the invention may be readily carried into effect, it will now be described with reference to the accompanying drawing, wherein.

In the FIGS., the same components are identified by the same reference numerals.

Figure 1:
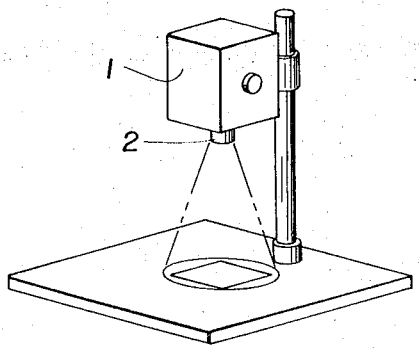
FIG. 1 is a perspective view of an embodiment of the photographic enlarger of the invention.
Figure 2:
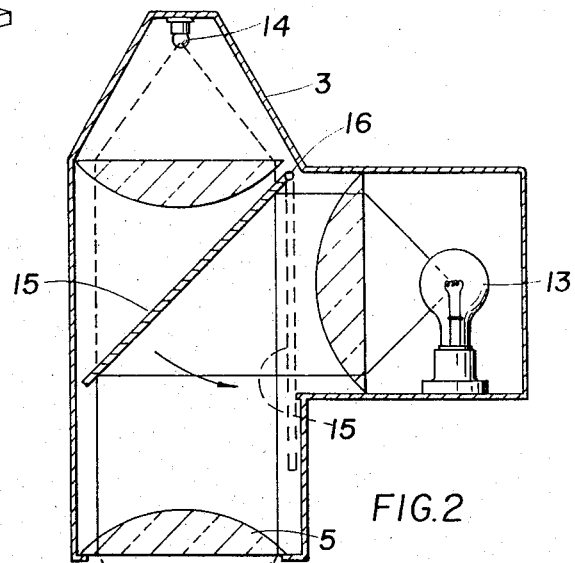
FIG. 2 is a view, partly in section, of an embodiment of the photographic enlarger of the invention.
Figure 3:
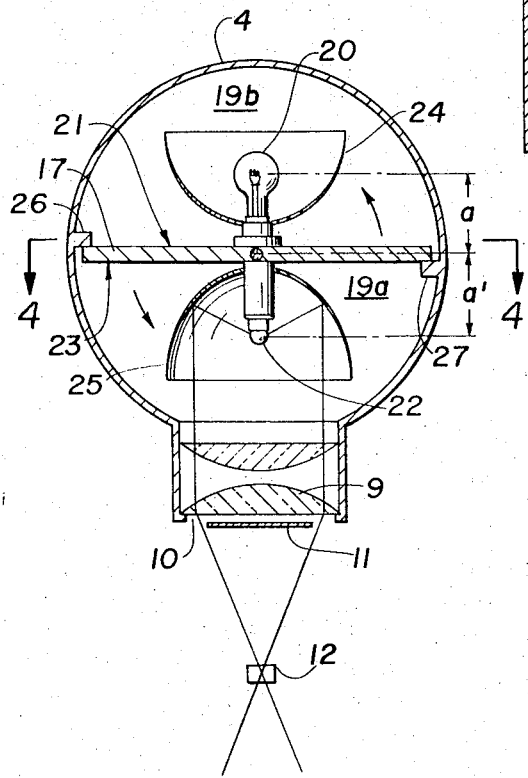
FIG. 3 is a view, partly in section, of another embodiment of the phographic enlarger of the invention.
Figure 4:
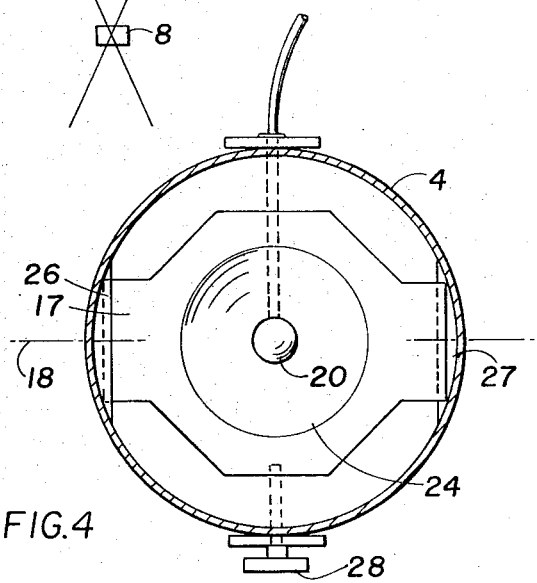
FIG. 4 is a view, partly in section, taken along the lines 4—4 of FIG. 3.

The photographic enlarger of the invention comprises a housing 1 having a light outlet opening 2 (FIG. 1). In the embodiment of FIG. 1 the housing 1 is of substantially cubic configuration. The housing 3 of the embodiment of FIG. 2 is a combination of geometric configurations. The housing 4 of the embodiment of FIGS. 3 and 4 is of substantially spherical configuration.

A condenser 5 is provided at the light outlet opening 6 of the housing 3 of the embodiment of FIG. 2 to illuminate a negative 7 to be enlarged (FIG. 2). A lens 8 is provided. A condenser 9 is provided at the light outlet opening 10 of the housing 4 of the embodiment of FIGS. 3 and 4 to illuminate a negative 11 to be enlarged (FIG. 3). A lens 12 is provided.

In the embodiment of FIG. 2, a first light source 13, which comprises a full-sized incandescent lamp, is mounted in the housing 3. A second light source 14, which comprises a miniature flashlight lamp, is mounted in the housing 3 at right angles to be first light source 13. A shutter 15 comprises a substantially rectangular mirror and is pivotally mounted at one edge 16 between the first and second light sources 13 and 14.

In one position, shown in FIG. 2 in solid lines, the mirror 15 is at substantially 45° to the first light source 13 and reflects the light therefrom through the condenser 5 and fully blocks the second light source 14. In another position, shown in broken lines, the mirror 15 is at substantially 90° to the first light source 13 thereby fully reflecting said first light source back to itself and is out of the path of light from the second light source 14 thereby permitting light from said second light source to pass through the condenser.

In the embodiment of FIGS. 3 and 4, a shutter 17 comprises an opaque plate pivotally mounted along an axis 18 (FIG. 4) thereof and divides the housing 4 into a first half 19a (FIG. 3), which includes the light outlet opening 10, and a second half 19b, which is blocked from the first half 19a and from said light outlet opening (FIG. 3). A first light source 20, which comprises a full-sized incandescent lamp, is mounted on one surface 21 of the plate 17. A second light source 22, which comprises a miniature flashlight lamp, is mounted on the other surface 23 of the plate 17.

In one position 180° opposite that shown in FIG. 3, the surface 21 mounting the first light source 20 bounds the first half 19a and the light from said first light source passes through the condenser 9 and the second light source 22 is in the second half 19b. In another position, which is at substantially 180° from its one position and is shown in FIG. 3, the surface 23 mounting the second light source 22 bounds the first half 19a and the light from said second light source passes through the condenser 9 and the first light source 20 is in the second half 19b.

In the embodiment of FIGS. 3 and 4, the first light source 20 has a reflector 24 and the second light source 22 has a reflector 25. First and second ledges 26 and 27 function as stops to maintain the plate 17 at each of its one and another positions and permit free rotation between said positions.

A knob 28 is affixed to the plate 17 and is outside the housing 4 to permit manual rotation of the plate 17 (FIG. 4).

In operation, the negative is positioned and the enlarger is set to the desired enlargement using the first light source. The first light source is utilized for focussing. The shutter is then rotated to block the light from the first light source. The second light source is then flashed repeatedly until the desired exposure has been attained.

While the invention has been described by means of specific examples and in specific embodiments, I do not wish to be limited thereto, for obvious modifications will occur to those skilled in the art without departing from the spirit and scope of the invention.

I claim:

1. A photographic enlarger, comprising a housing having a light outlet opening;
   a condenser at the light outlet opening of the housing adapted to illuminate a negative to be enlarged;
   a first light source mounted in the housing and comprising a full-sized lamp;
   a second light source mounted in the housing and comprising a flashlight; and
   a shutter pivotally mounted in the housing and having one position in which it blocks light from the second light source and directs light from the first light source through the condenser and another position in which it blocks light from the first light source and directs light from the second light source through the condenser.

2. A photographic enlarger is claimed in claim 1, wherein the first light source comprises a full-sized incandescent lamp and the second light source comprises a miniature flashlight lamp.

3. A photographic enlarger as claimed in claim 1, wherein the first and second light sources are mounted at right angles to each other and the shutter comprises a substantially rectangular mirror pivotally mounted at one edge between the first and second light sources in a manner wherein in its one position the mirror is at substantially 45° to the first light source and reflects the light therefrom through the condenser and fully blocks the second light source and in its other position the mirror is at substantially 90° to the first light source thereby fully reflecting the first light source back to itself and is out of the path of light from the second light source thereby permitting light from the second light source to pass through the condenser.

4. A photographic enlarger is claimed in claim 1, wherein the shutter comprises an opaque plate pivotally mounted along an axis thereof and dividing the housing into a first half which includes the light outlet opening and a second half which is blocked from the first half and from the light outlet opening and the first light source is mounted on one surface of the plate and the second light source is mounted on the other surface of the plate in a manner wherein in its one position the surface mounting the first light source bounds the first half and the light from the first light source passes through the condenser and the second light source is in the second half and in its other position at substantially 180° from its one position the surface mounting the second light source bounds the first half and the light from the second light source passes through the condenser and the first light source is in the second half.

5. A photographic enlarger as claimed in claim 4, wherein the housing is substantially spherical and each half is substantially hemi-spherical, and further comprising stop means for maintaining the plate at each of its one and other positions and permitting free rotation between said positions.

* * * * *